(No Model.) 6 Sheets—Sheet 1.
O. BRYANT.
MACHINE FOR BORING AND TAPPING RADIATORS.

No. 422,877. Patented Mar. 4, 1890.

Witnesses.
Harriet Johnson
Geo. E. Crosby

Orrin Bryant, Inventor.
By James Sangster
Attorney.

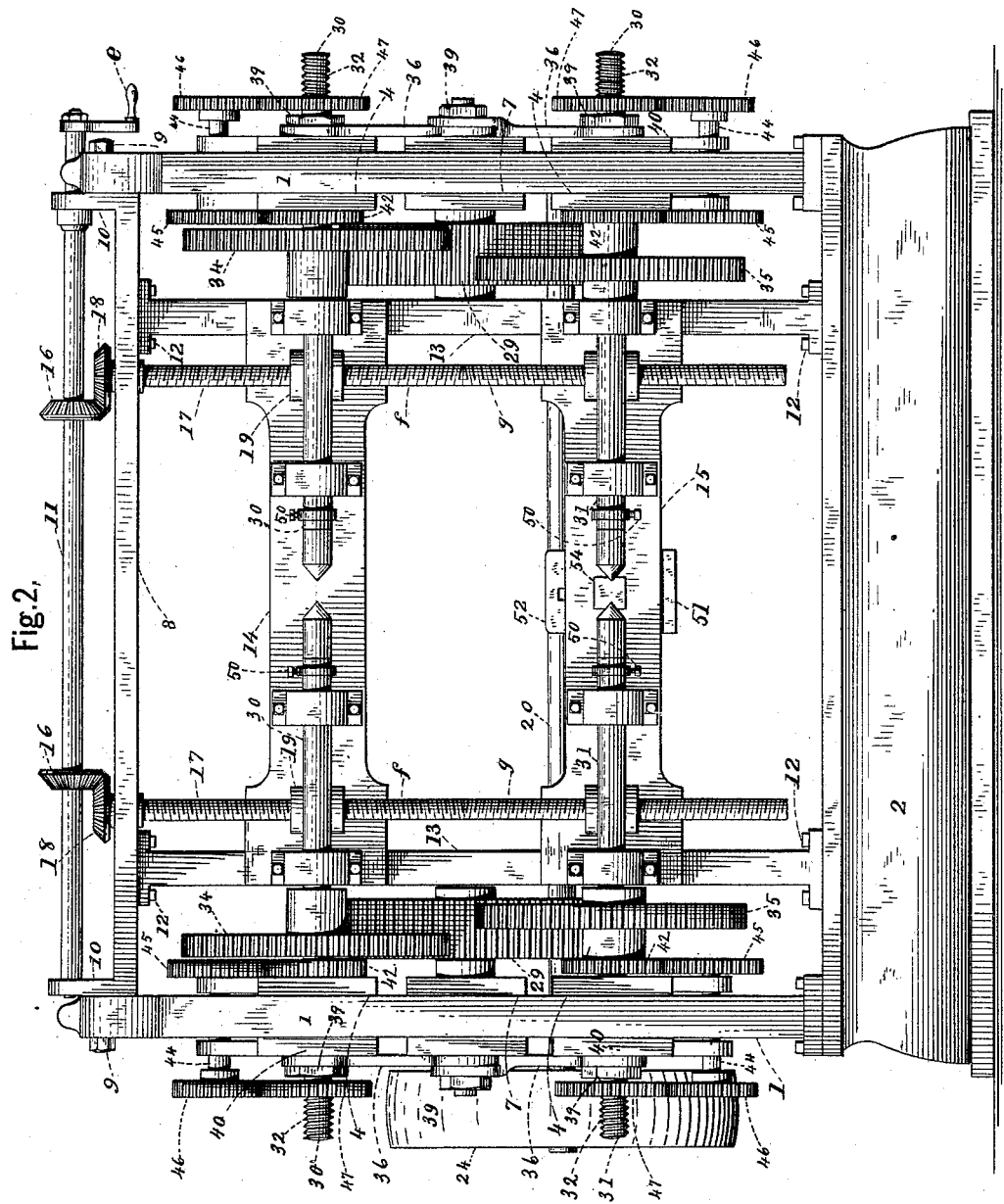

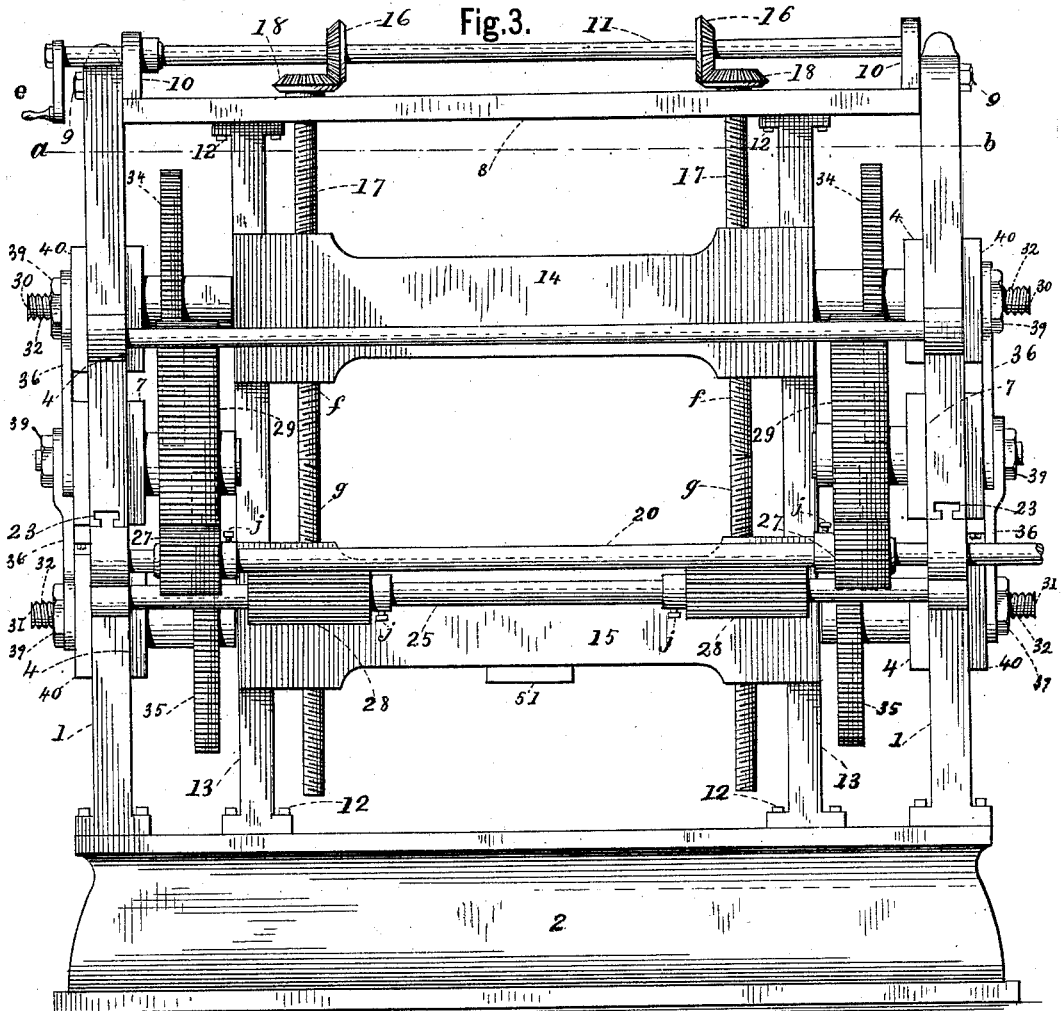

(No Model.) 6 Sheets—Sheet 4.

O. BRYANT.
MACHINE FOR BORING AND TAPPING RADIATORS.

No. 422,877. Patented Mar. 4, 1890.

Witnesses. Orrin Bryant, Inventor.
By James Sangster, Attorney.

(No Model.) 6 Sheets—Sheet 5.

O. BRYANT.
MACHINE FOR BORING AND TAPPING RADIATORS.

No. 422,877. Patented Mar. 4, 1890.

Witnesses.
Harriet Johnson
Geo. E. Crosby

Orrin Bryant. Inventor.
By James Sangster,
Attorney.

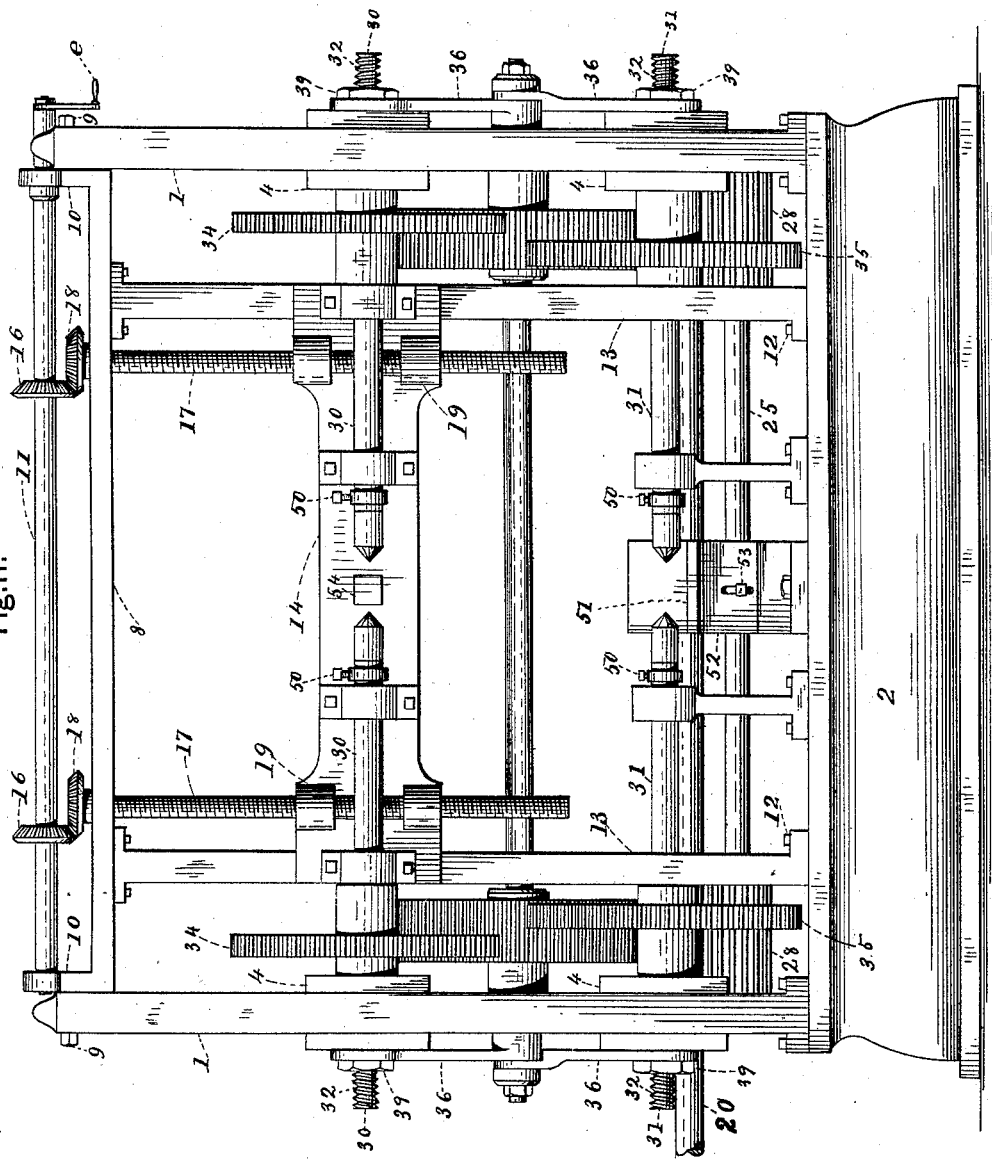

UNITED STATES PATENT OFFICE.

ORRIN BRYANT, OF BUFFALO, NEW YORK, ASSIGNOR TO THE PIERCE STEAM HEATING COMPANY, OF SAME PLACE.

MACHINE FOR BORING AND TAPPING RADIATORS.

SPECIFICATION forming part of Letters Patent No. 422,877, dated March 4, 1890.

Application filed May 25, 1888. Serial No. 275,026. (No model.)

*To all whom it may concern:*

Be it known that I, ORRIN BRYANT, a citizen of the United States, residing in Buffalo, in the county of Erie and State of New York, have invented certain new and useful Improvements in Machines for Boring and Tapping Radiators, of which the following is a specification.

My invention relates to machines for boring and tapping radiators, whereby four holes may be bored or tapped at one operation, two holes on each side opposite each other, and whereby the machine may be readily adjusted to bore or tap radiators of different sizes or lengths, all of which will be fully and clearly hereinafter described and claimed, reference being had to the accompanying drawings, in which—

Figure 1:
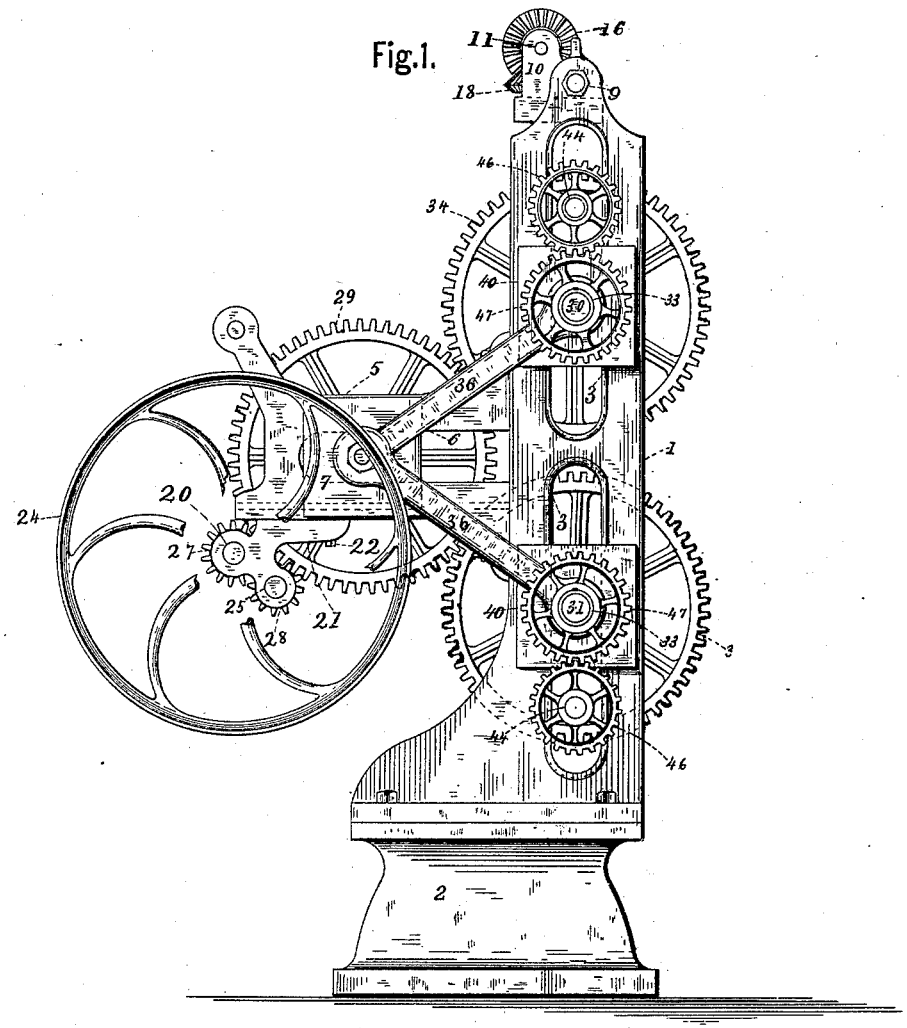
Figure 5:
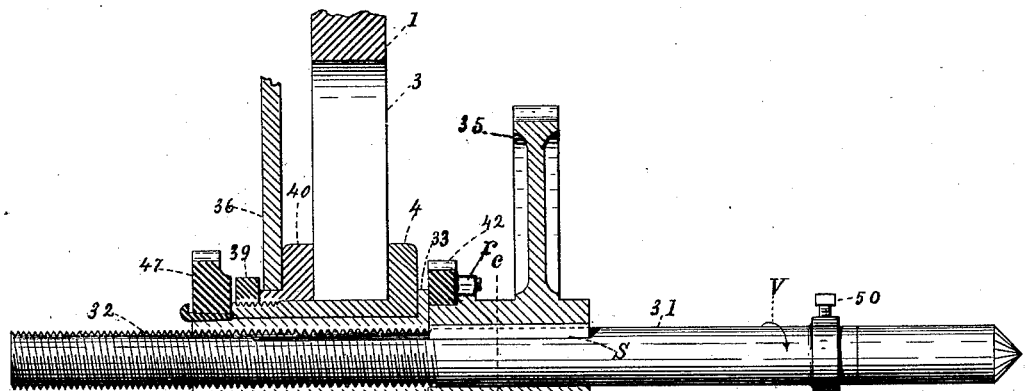
Figure 8:
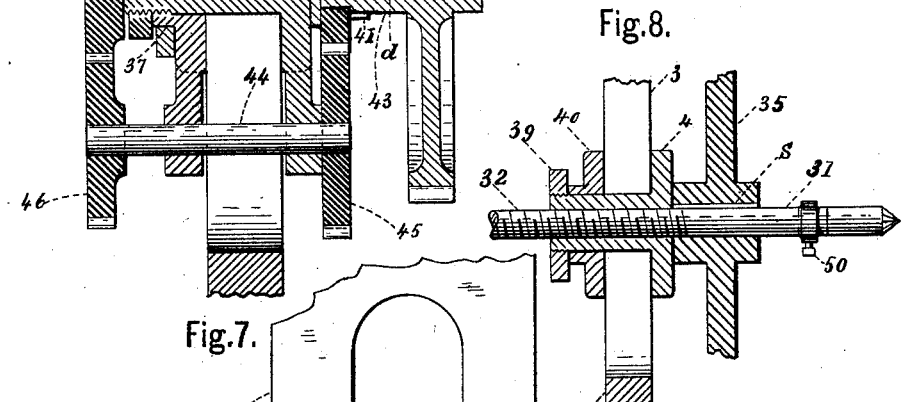
Figures 6, 7:
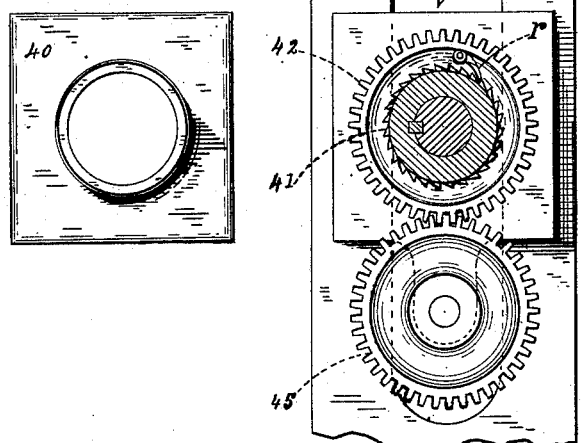
Figure 9:
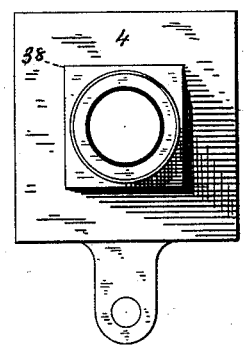
Figure 10:
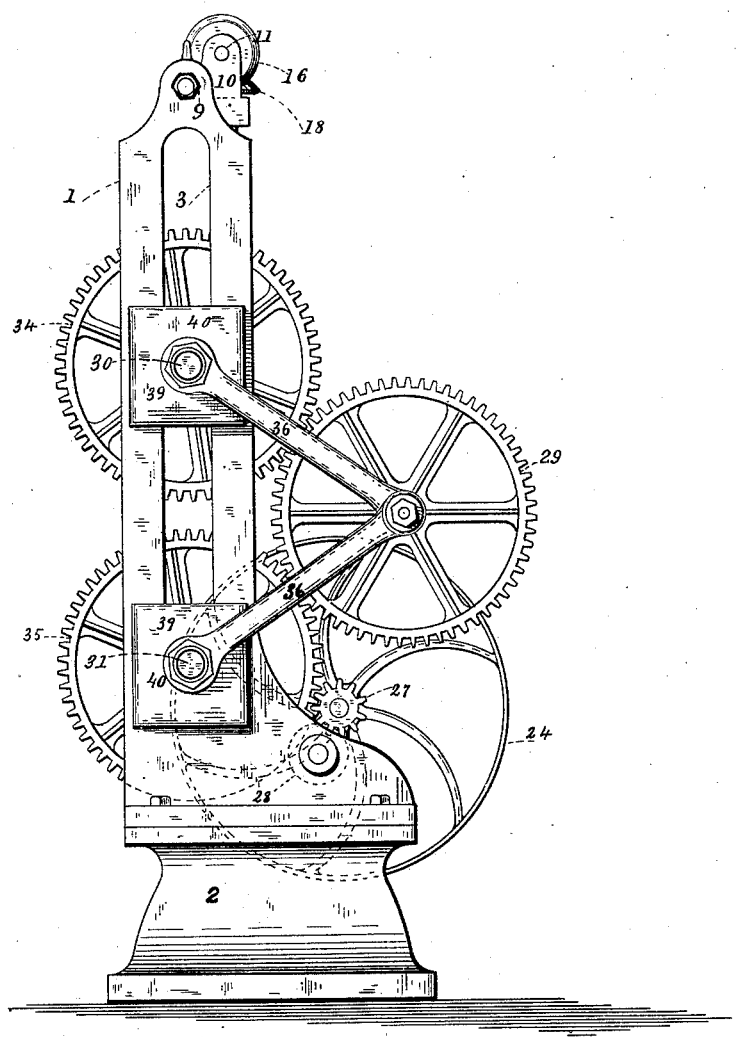

Figure 1 is a side elevation, a portion being broken away from the center of the driving-pulley, so as to expose the driving-pinions. Fig. 2 is a front elevation. Fig. 3 is a rear elevation. Fig. 4 represents a top plan view of a portion of the frame of the machine, showing a horizontal section on line $a\,b$, Fig. 3, and a top view of part of the mechanism for adjusting the tapping or boring bars. Fig. 5 is a sectional elevation cutting through a portion of one side of the frame and gearing for operating the boring and tapping bars, also a side elevation of one of said bars. Fig. 6 is an outside view of one of the caps for keeping the boxes in position. Fig. 7 represents a portion of one side of the frame, showing a section through line $c\,d$, Fig. 5. Fig. 8 is a modification of the same. Fig. 9 is an inside face view of one of the boxes, and Figs. 10 and 11 represent side and front elevations showing modifications of the invention.

In said drawings, 1 represents the two vertical side frame-pieces of the machine. They are secured to the base 2 by bolts in the ordinary way, and are each provided with openings or slideways 3 to receive the boxes 4, which carry the boring-bars. They are also provided with horizontal portions 5, having slideways or openings 6 to receive the boxes 7. At the top of the frame is a cross connecting-bar or cross-head 8, secured by bolts 9 and provided with bearings 10, in which is mounted a horizontal shaft 11, having a handle $e$, by which it is turned.

To the base of the machine and to the bar 8 is secured by bolts 12 two vertical cars 13, which act as guideways for the movable cross-bars 14 and 15. These cross-bars 14 and 15 are provided with grooves or slots at their ends, into which the upright bars 13 fit, and act as slideways for them. (See Fig. 2, also Fig. 4, in which a sectional end view of the bars 13 is shown in position within the grooves in the ends of the bars 14.)

On the shaft 11 are secured two bevel gear-wheels 16, and in the cross-bar 8 are journaled two vertical screw-shafts 17, each having bevel gear-wheels 18 at the top adapted to gear in with the wheels 16. These vertical shafts 17 are each provided with right and left hand screws $f\,g$, and pass through screw-boxes 19, rigidly secured to the horizontal movable or adjustable bars 14 and 15. The object of these cross-bars is to carry the opposite ends of the tapping and boring bars. From this construction it will be seen that by turning the handle $e$ the bars 14 and 15 and the tapping and boring bars which they carry may be made to move toward or from each other.

The driving-shaft 20 is mounted in movable boxes 21, each box being secured by a bolt 22 in any well-known way to the boxes 7. Sometimes it may be necessary to hang the boxes 21 in grooved slideways 23. (Shown in Fig. 3.)

24 represents the driving-pulley. Below the driving-shaft is another shaft 25, mounted in bearings 26 in the same sliding pieces containing the bearings for the driving-shaft. Both the driving-shaft and the shaft 25 are provided with pinions 27 28, adapted to slide along the shaft and be adjusted and fastened by set-screws $j$, or they may be made to slide on feathers, so as to prevent them from turning on the shafts, or they may be fastened in any other well-known way for that purpose.

It will be noticed that the pinions 28 are made double the length of the pinions 27. This is so that when the pinions 27 are slipped along the driving-shaft, so as to be out of gear with the spur-wheels 29, they will still be in gear with the pinions 28, and by this means the pinions 27, being on the driving-shaft, will turn the pinions 28, transmitting their movements to the spur-wheels 29, and thereby reverse the action of the machine. It will be further seen from this construction that by moving the pinions 28 out of gear and the pinions 27 into gear with the spur-wheels 29 they will move in the opposite direction.

30 represents the upper tapping and boring bars, and 31 the lower pair of boring and tapping bars. Each is provided with screw portions 32, preferably at the outer ends, as shown, which screw into sleeves 33, fitted to run loosely in bearings in the boxes 4. (See Fig. 5, in which it is shown in an enlarged sectional elevation.) Each of the tapping and boring bars is provided with a spur gear-wheel, the upper wheels being represented by the numerals 34 and the lower wheels by the numerals 35. Feathers $s$ prevent them turning on the bars. (Shown in Fig. 5.) These wheels 34 and 35 are all in gear with the gear-wheels 29, but never with each other, and are all kept in gear by the links 36. From this construction it will be seen that the tapping and boring bars may be adjusted at any desired point to or from each other without in any way throwing the driving mechanism out of gear. These boxes 4 are made square at the point 38, where they pass through the frame, (see Fig. 9,) and are each provided with a cap 40, (see Fig. 6,) which is provided with a portion 37, over which one end of the links 36 pass and are secured by nuts 39, which screw on up against the shoulder 37 and keep the links securely in place.

The opposite ends of each pair of links are secured side by side on the stud or shaft that carries the gear-wheels 29, thereby keeping the wheels 34 and 35 continually in gear with the wheels 29, while permitting said wheels to be adjusted toward or from each other, as before mentioned.

When the machine is used for boring and a slower feed is required, a ratchet 41 is put onto the hub of each wheel 34 and 35, (see Fig. 5,) and alongside of the ratchet-wheel is a small gear-wheel 42, fitted loosely on the hub 43 and provided with a pawl $r$, pivoted thereto.

On the lower portions of each of the boxes 4 are bearings in which is mounted a shaft 44, having rigidly secured to it a gear-wheel 45, of the same size as the wheel 42 and adapted to gear in with it. At the opposite end of the shaft 44 is rigidly secured another gear-wheel 46, of smaller diameter, and on the end of the sleeve 33 is keyed or otherwise rigidly secured another gear-wheel 47, of larger diameter, adapted to gear in with the gear-wheel 46. By this means it will appear that when the boring-bars are moving in the direction of the arrow $v$ (shown in Fig. 5, also Fig. 7) the pawl $r$ engages with the ratchet-teeth and causes the gear-wheel 42 to move in the same direction and the wheels 45 and 46 to move in a reverse direction. This operation causes the screw-sleeve 33 to move in the same direction with the tapping and boring bar, but slower. Consequently it reduces the forward movement of the boring-bar in proportion to the difference between the motion of the bar and that of the sleeve. It is apparent from this that if the sleeve should move with the same velocity with the bar it would have no longitudinal movement.

The gear-wheels 46 and 47 may be made removable in any well-known way, so that gears of different proportions may be put on, and the speed of the longitudinal movement of the boring-bars thereby regulated as may be desired.

When the machine is used only for the purpose of tapping several holes in both sides of a radiator at the same time, the sleeve 33, gear-wheels 42, 45, 46, and 47, and the pawl and ratchet may be dispensed with. In this case the tapping and boring bars operate directly in the boxes 4, substantially as shown in Fig. 8. This gearing is also left off from the drawings in Figs. 3 to 10, and also from Fig. 11.

In the modifications, Figs. 10 and 11, I have shown a construction whereby the tapping and boring bars, instead of both moving simultaneously toward each other or away from each other while being adjusted, one pair of the boring-bars and their gearing (the lower pair in this instance) remains stationary while the upper pair and its gear-wheels are moved (during the operation of adjusting) by the screw bars or shafts 17, while in this case the screws run one way only, as will be seen by reference to Fig. 11. Otherwise the construction and operation are substantially the same. The adjustment is made and the gear-wheels 29 are kept in gear with the gears 34 and 35 in the same way by the links.

It will be noticed that the gear-wheels 29 have a broad face. The object of this is to leave room for the gears 34 and 35 to pass each other when adjusting near together. (See Fig. 2, also Figs. 3 and 11, where the gears 34 and 35 are shown as adapted to pass each other as far as the hubs will permit.)

The tapping and boring tools are fitted in the ends of the boring and tapping bars in the usual way by set-screws 50, so as to be removable for sharpening or otherwise repairing them.

In operating with this invention a radiator is set up endwise on the adjustable platform 51. This platform is made of an L-shaped form, so that the slotted vertical back piece 52 rests against the cross-bar 15 and is secured by a bolt 53. There is also a bolt 54, which is also adjustable back and forth by simply turning it. It may be fastened at any point adjusted by a well-known jam-nut.

The machine being set in motion, both sides of the radiator may be, as will be readily seen, finished at once.

I claim as my invention—

1. In a machine for boring and tapping radiators, the combination, with a supporting-frame, of supporting portions adjustable the one to the other upon said frame and boring-bars mounted on each of said adjustable supporting portions having both a longitudinal reciprocating movement to and from each other and a simultaneous rotating movement, substantially as described.

2. In a machine for boring and tapping radiators, the combination of the boring and tapping bars, two on opposite sides of the machine, with their cutting ends facing each other and each provided with a screw portion, screw-boxes adapted to receive the screw portions, boxes mounted on adjustable cross-bars to receive the opposite ends of the tapping or boring bars, and a means for moving the boxes, and thereby adjusting the tapping and boring bars to and from each other, substantially as described.

3. In a machine for boring and tapping radiators, the combination of the machine-frame provided with slideways for receiving the boxes, two on each side the machine, carrying the screw portions of the boring and tapping bars, and with slideways running at right angles, or substantially so, to the slideways for the boring and tapping bars, boxes for carrying the opposite ends of the tapping and boring bars and keeping them in line, a gear-wheel mounted on a feather on each of the boring and tapping bars, mechanism for adjusting one or both pairs of said bars and their gear-wheels toward or from each other, two gear-wheels mounted on shafts secured to laterally-moving boxes, one on each side of the machine, and held in gear with the gearing mounted on the boring and tapping bars by connecting-links, and driving-pinions mounted on the driving-shaft for giving said wheels a rotary movement, whereby the adjustment of the boring and tapping bars to or from each other may be given without throwing any of the gear-wheels out of gear, substantially as described.

4. In a machine for boring and tapping radiators, two boring and tapping bars, each having a screw portion at one end and each provided with spur gear-wheels for giving them a rotary motion, feathers for preventing them from turning on the tapping and boring bars, and screw-boxes adapted to receive the screw portions of the boring-bars to give them a combined rotary and longitudinal movement, in combination with a spur gear-wheel adapted to gear in with the wheels carrying the tapping and boring bars and mounted on a stud secured to a box adapted to move in slideways perpendicular to the slideways for the tapping and boring bars, a pinion mounted on a shaft secured to the box carrying the gear-wheel, and links for keeping the three spur-wheels together, for the purposes set forth.

5. In a machine for boring and tapping radiators, the combination of a tapping or boring bar provided with a screw portion mounted in a screw-sleeve in the box 4, a gear-wheel having a ratchet 41, mounted on the boring-bar, a feather s, to prevent the gear-wheel from turning thereon, mechanism consisting of the wheel 42, set loosely on its bearing and provided with a pawl r, and adapted to gear with the wheel 45 and with a wheel rigidly secured to a shaft mounted on the box 4, a smaller wheel at the opposite end of said shaft adapted to gear with a larger wheel rigidly secured to the screw-sleeve, whereby when the boring and tapping bar is rotating in the direction of the arrow v it has a comparatively slow movement forward when moving and cutting, and when moving in a reverse direction a quick return movement, substantially as described.

6. In a machine for boring and tapping radiators, the combination, with a supporting-frame, of supporting-bars adjustable to or from each other upon said frame, boring-bars mounted on each of said adjustable supporting-bars having a combined rotary and a longitudinal reciprocating movement to and from each other, and an adjustable platform to support the end of the radiator, substantially as described.

7. In a machine for boring and tapping radiators, the combination, with the supporting-frame, of supporting-bars adjustable the one to the other and a pair of boring-bars mounted in bearings in a horizontal line on each of said supporting-bars, so that as their boring ends face each other their opposite ends have a screw-threaded engagement with boxes in the frame of the machine, and a means for rotating the boring-bars, whereby they may receive a combined simultaneous rotating and reciprocating movement, substantially as described.

ORRIN BRYANT.

Witnesses:
JAMES SANGSTER,
EDWARD WALTER.